US012656108B2

(12) United States Patent
Maehnert et al.

(10) Patent No.: US 12,656,108 B2
(45) Date of Patent: Jun. 16, 2026

(54) METHOD FOR ASCERTAINING AN OPERATING ANGLE BETWEEN A TRACTOR AND A TRAILER OF THE TRACTOR

(71) Applicant: Robert Bosch GmbH, Stuttgart (DE)

(72) Inventors: Uwe Maehnert, Bietigheim-Bissingen (DE); Jerg Pfeil, Cleebronn (DE); Martin Goth, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 953 days.

(21) Appl. No.: 17/605,516

(22) PCT Filed: Apr. 17, 2020

(86) PCT No.: PCT/EP2020/060883
§ 371 (c)(1),
(2) Date: Oct. 21, 2021

(87) PCT Pub. No.: WO2020/229094
PCT Pub. Date: Nov. 19, 2020

(65) Prior Publication Data
US 2022/0196395 A1      Jun. 23, 2022

(30) Foreign Application Priority Data

May 14, 2019      (DE) ..................... 10 2019 206 985.1

(51) Int. Cl.
*G01B 11/26*          (2006.01)
*B60D 1/62*           (2006.01)
          (Continued)
(52) U.S. Cl.
CPC ................ *G01B 11/26* (2013.01); *B60D 1/62* (2013.01); *G06T 7/11* (2017.01); *G06T 7/73* (2017.01); *G06T 2207/30252* (2013.01)

(58) Field of Classification Search
CPC ............. G01B 11/26; B60D 1/62; G06T 7/11; G06T 7/73; G06T 2207/30252
See application file for complete search history.

(56) References Cited

U.S. PATENT DOCUMENTS

| | | | | |
|---|---|---|---|---|
| 2014/0160276 A1* | 6/2014 | Pliefke | .................. | H04N 5/272 348/118 |
| 2015/0203128 A1* | 7/2015 | Strano | .................. | B60W 30/02 701/1 |

(Continued)

FOREIGN PATENT DOCUMENTS

| | | |
|---|---|---|
| CN | 102791557 A | 11/2012 |
| CN | 104590116 A | 5/2015 |

(Continued)

OTHER PUBLICATIONS

EP-3032517-A1, Translation (Year: 2016).*

(Continued)

*Primary Examiner* — Tarifur R Chowdhury
*Assistant Examiner* — Carlos Perez-Guzman
(74) *Attorney, Agent, or Firm* — NORTON ROSE FULBRIGHT US LLP

(57) ABSTRACT

A method for ascertaining an operating angle between a tractor and a trailer of the tractor. The method includes: ascertaining camera images carried out in a chronologically consecutive manner with the aid of at least one rear-facing camera situated on the tractor; detecting structures of the trailer in the camera images; and ascertaining the operating angle by evaluating the detected structures in the camera image.

9 Claims, 2 Drawing Sheets

(51) Int. Cl.
    *G06T 7/11*           (2017.01)
    *G06T 7/73*           (2017.01)

(56)                 References Cited

U.S. PATENT DOCUMENTS

| | | |
|---|---|---|
| 2018/0253608 A1 | 9/2018 | Diessner et al. |
| 2019/0322317 A1* | 10/2019 | Pourrezaei Khaligh ................... |
| | | B62D 13/06 |
| 2021/0133051 A1* | 5/2021 | Kumarasamy ...... G06F 11/2094 |
| 2022/0136823 A1* | 5/2022 | Joshi .................... G01S 7/4817 |
| | | 701/300 |

FOREIGN PATENT DOCUMENTS

| | | | |
|---|---|---|---|
| CN | 108466649 A | 8/2018 | |
| DE | 102010006521 A1 | 9/2010 | |
| DE | 102010006323 A1 | 8/2011 | |
| DE | 102011113197 A1 | 3/2013 | |
| DE | 102014007900 A1 | 12/2015 | |
| DE | 102016123885 A1 | 6/2017 | |
| DE | 102017103540 A1 | 8/2018 | |
| EP | 3032517 A1 * | 6/2016 | ............... B60R 1/00 |

OTHER PUBLICATIONS

International Search Report for PCT/EP2020/060883 Issued Aug. 3, 2020.

Fuchs et al. "3D Pose Estimation for Articulated Vehicles Using Kalman-Filter Based Tracking" Pattern Recognition and Image Analysis, 2016, vol. 26, No. 1, pp. 109-113.

\* cited by examiner

400

METHOD FOR ASCERTAINING AN OPERATING ANGLE BETWEEN A TRACTOR AND A TRAILER OF THE TRACTOR

FIELD

The present invention relates to a method for ascertaining an operating angle between a tractor and a trailer or semitrailer of the tractor. Moreover, the present invention relates to a device for ascertaining an operating angle between a tractor and a trailer of the tractor. The present invention also relates to a computer program product having program code for carrying out the present method.

BACKGROUND INFORMATION

A movement model for tractor trailers having one or multiple trailers or semitrailers is required in order to describe a trajectory of a truck including one or more trailers or semitrailers. This is usually approximated by an estimate of the angle between the tractor and the trailer and estimated on the basis of a mathematical model. However, this estimate creates uncertainties which may lead to an error in the movement model.

SUMMARY

It is an object of the present invention to provide an improved method for ascertaining an angle between a tractor and a trailer of the tractor.

According to a first aspect of the present invention, this object may be achieved by a method for ascertaining an operating angle between a tractor and a trailer of the tractor trailer. In accordance with an example embodiment of the present invention, the method comprises the following steps:

Ascertaining camera images in a chronologically consecutive manner with the aid of at least one rear-facing camera situated on the tractor;

Detecting structures of the trailer in the camera images; and

Ascertaining the operating angle by evaluating the detected structures in the camera images.

Since the operating angle is an important variable incorporated into the ego movement model of the vehicle, e.g., the truck, a correct ascertainment of the operating angle is of great importance. If the operating angle was ascertained incorrectly, uncertainties of the operating angle may become even greater by least error squares in a disadvantageous manner. The ascertainment of the operating angle as provided ultimately facilitates an improved preparation of the current ego movement model of the vehicle.

According to a second aspect of the present invention, the object may achieved by a device for ascertaining an operating angle between a tractor and a trailer of the tractor. In accordance with an example embodiment of the present invention, the device comprises:

a detection device for detecting at least two consecutively ascertained camera images with the aid of at least one rear-facing camera situated on the tractor; and an ascertainment device, which is functionally connected to the detection device, for detecting the operating angle by evaluating detected structures in the camera images.

According to a third aspect, the object is achieved by a computer program product having program code (means) that are executed on a provided system or stored on a computer-readable memory medium. In an advantageous manner, the present method may thereby be developed as a software and thus be modified and adapted in an uncomplicated and efficient manner.

Advantageous further refinements of the present method are disclosed herein.

One advantageous further refinement of the present method provides that flow vectors of an optic flow are formed from the camera images in step b), and similar structures are ascertained in chronologically consecutive camera images. In the process, matching elements in camera images are detected from which the operating angle is ascertained.

Another advantageous further refinement of the present method provides that an image of a rear edge of the trailer is detected for the optic flow. In an advantageous manner, this is easily possible using what is known as an "edge detection algorithm". Alternatively, it is also possible to ascertain other matching structures in camera images via the optic flow such as areas of the trailer.

An additional further refinement of the present invention provides that a disparity of image elements of the camera images is ascertained in step b) in order to detect the structures of the trailer in the camera images. This variant uses a camera in the form of a stereo camera for which a basic distance of the two lenses is known. For system-related reasons, this produces a slight shift in the two camera images recorded by the different lenses, and a distance to the object detected through imaging is measured via a triangulation. This makes it possible to infer the operating angle by ascertaining a changed distance.

An additional further refinement of the present method provides that an image data segmentation of the camera images is carried out in step b) in order to detect the structures of the trailer in the camera images, and a size and/or length of the trailer is/are ascertained by counting the image pixels. This advantageously provides an alternative method for detecting structures in the camera images.

Another advantageous further refinement of the present invention provides that in the detection of structures of the trailer in the camera images, a classification of the detected structures is used and/or a neural network is trained. In this way, as well, an alternative method for detecting structures in the camera images is provided.

An additional advantageous further refinement of the present method provides that a mean value calculation is carried out when ascertaining the operating angle by evaluating the detected structures in the camera images. This realizes a type of confidence estimate, the precision of the ascertained operating angle becoming proportionally greater the more of the provided methods are employed for detecting the structures in the camera images. For practical purposes, at least two different methods are employed for ascertaining the structures.

Another advantageous further refinement of the present method provides that at least one of the following parameters of the vehicle is used for ascertaining the operating angle: the trailer length, the trailer height, the height of the cargo area of the trailer, the speed of the tractor, and the yaw rate of the tractor. This makes it possible to ascertain the operating angle even more precisely by considering further parameters of the vehicle.

An additional advantageous further refinement of the present method provides that at least one of the following operating angles is ascertained: the angle of roll, the angle of traction, the pitch angle and the articulation angle. With the aid of the provided method, it is thus possible to ascertain different types of operating angles between a tractor and trailer which all represent different operating states or geometric orientations of the tractor and trailer.

Another advantageous further refinement of the method provides that the camera images are recorded in step b) using one or two camera(s). In an advantageous manner, the ascertainment of the operating angle with the aid of two cameras is able to be carried out even more accurately.

An additional advantageous further refinement of the present method provides that the ascertained operating angle is used for setting up an ego movement model of the truck. The ego movement model constitutes an important input variable for various driver assistance systems and thus benefits from the precise ascertainment of the operating angle. This ultimately facilitates a better operating characteristic of the driver assistance systems as a function of the ascertained operating angle.

Additional measures improving the present invention are represented in greater detail together with the description of the preferred exemplary embodiments of the present invention with the aid of figures. However, the figures are not necessarily drawn true to scale.

DETAILED DESCRIPTION OF EXAMPLE EMBODIMENTS

Generally, barely any sensor equipment for detecting ego movements of the trailers is installed on trailers or semitrailers of trucks. Since a tractor travels with many different trailers or semitrailers in a normal daily operation, retrofitting with the mentioned sensor system is complex and not meaningful for economic reasons, in particular. Even in the tractor itself, the driving dynamics of the trailer or semitrailer are unable to be detected by the existing sensor equipment (e.g., a sensor system for ESP).

The use of at least one, preferably two or more, rear-facing cameras on the tractor is provided so that the rear environment of the tractor including the trailer is detected with the aid of imaging, i.e., by chronologically consecutive image sequences ("video image"). Depending on the operating angle between the tractor and the trailer or semitrailer or the trailer combination, a part of the trailer or the semitrailer or the trailer combination is situated within the camera image, which makes it possible to ascertain the articulation angle (i.e. the angle between the tractor and the trailer) based on the pixel number. Using the articulation angle ascertained in this manner, an ego movement model of the vehicle such as the truck is advantageously ascertainable in a considerably more precise manner.

Moreover, a detection of the shifting of the rear edge of the trailer also makes it possible to estimate a different operating angle in the form of an angle of roll, so that rolling of the trailer is able to be detected in a timely manner and appropriate countermeasures (e.g., assistant-supported braking and/or steering maneuvers) are able to be initiated. This, too, is required for modeling the ego movement of the vehicle.

In an advantageous manner, at least one of the following operating angles $\alpha$ is able to be ascertained by the provided method: the angle of roll, the angle of traction, the pitch angle, and the articulation angle.

In addition, the provided method advantageously also makes it possible to estimate the angle rates (that is to say, changes over time in the mentioned different operating angles) of the ego movement of the trailer or semitrailer by detecting the shifting of objects in the image.

As a result, the possibility is provided to use a rear-facing camera for carrying out a measurement of the articulation angle and the angle of roll that play a role in turning and maneuvering processes, when changing lanes, swinging in and out of lanes and also in possible rolling or tilting occurrences while driving so that an ego movement of the entire vehicle is able to be predicted.

Figure 1:
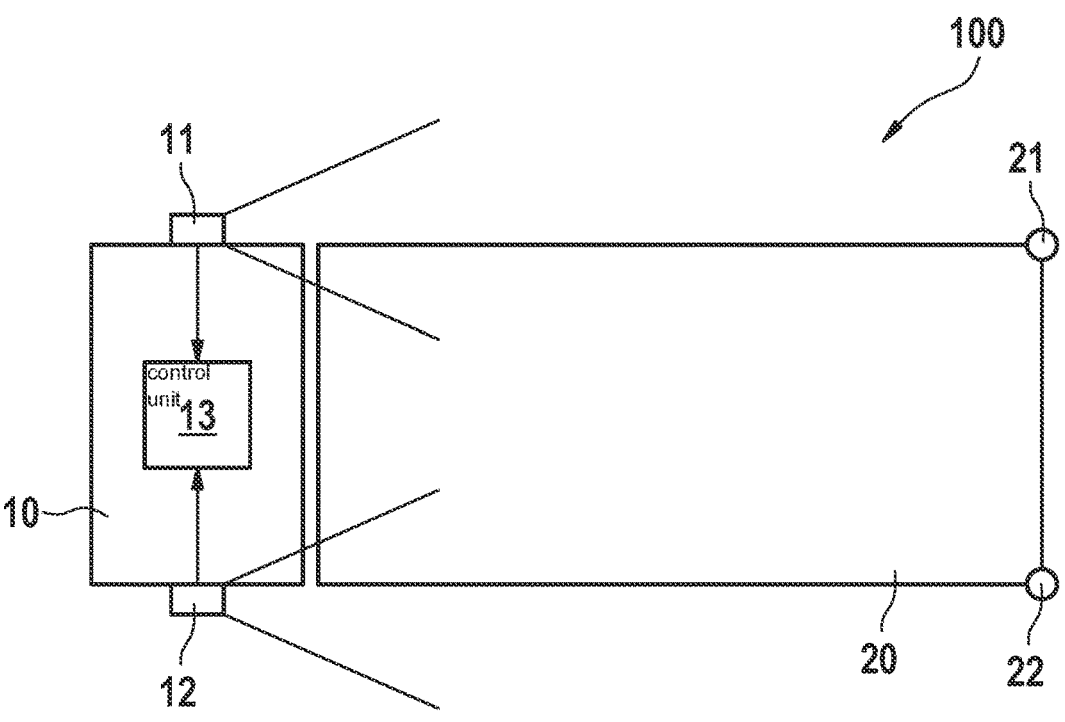
FIG. 1 shows a basic top view of a truck having a tractor and a trailer.

FIG. 1 shows a basic top view of a vehicle 100 having a tractor 10 and a trailer 20 which is linked to tractor 10. For example, vehicle 100 may be embodied as a truck or as some other vehicle having a trailer (e.g., a passenger car having a camping trailer, etc.). It can be seen that a rear-facing camera 11, 12 is mounted on both sides of tractor 10. Cameras 11, 12, for instance, may be situated in the vicinity of the rearview mirrors (not shown) or also in the front or rear part of tractor 10, so that cameras 11, 12 always have a pivot region of trailer 20 in their field of view when vehicle 100 is in operation. If trailer 20 is not visible in a camera 11, 12 because vehicle 100 is driving around a corner, then the respective other camera 11, 12 will be used for this purpose. Camera 11, 12 detects in particular a rear edge 21, 22 of trailer 20 as 2D coordinates in the individual image based on possibilities that will be described in greater detail in the further text.

Using a parameterization of technical trailer data (e.g., the length, height of the cargo area, the height of the cargo area above the floor, etc.), the position of rear edge 21, 22 is calculated in a vehicle coordinate system. The length and height of the cargo area is also able to be determined independently using existing methods of a surface estimation.

To improve the robustness of the position estimate of rear edge 21, 22 and to avoid faulty detections on similar structures (e.g., a lamp post, traffic sign or the like), a filter (e.g., an extended Kalman filter or a similar device) is optionally able to be used. Based on the vehicle dynamics and previous measurements, it predicts the movement of trailer 20 and uses this information for measuring operating angle $\alpha$.

The filtered measurements of left and right camera 11, 12 are combined in a central control unit 13 or in one of cameras 11, 12. The articulation angle and the angle of roll are used for determining the trajectory of trailer 20. Based on this information, the entire trajectory of entire vehicle 100, among others also the tractrix, for example, are able to be modeled. This may be used for the lateral control of vehicle 100 within the scope of existing systems, such as a lane-keeping assistant or in the field of automated driving.

The aforementioned imaging detection of rear edges 21, 22 of the trailer is able to be realized in different ways, which will be described in greater detail in the following text.

(i) First Option: Optic Flow

In this case, conventional methods are used to ascertain an optic flow or a flow vector from the camera images using chronologically consecutive camera images (image sequences or video images) of cameras 11, 12. Since trailer 20 barely moves when traveling, in contrast to the environment, the flow field of the optic flow separates trailer 20 from the environment so that rear edge 21, 22 of the trailer is able to be detected in an imaging manner.

(ii) Second Option: Disparity Estimate

The use of a camera 11, 12 embodied as a stereo camera makes it possible to ascertain an item of depth information for every pixel with the aid of a disparity estimate. Using a triangulation, the area of trailer 20 or other structures of trailer 20 is then able to be separated from the background.

(iii) Third Option: Image Data Segmentation

In the event that the image itself ascertained with the aid of camera 11, 12 is used, then rear edge 21, 22 or an area of trailer 20 is able to be determined by detecting rear edge 21, 22 using classifications or a neural network. This is possible because the trailer area as a homogeneous area is able to be separated from the rest of the environment. Since the trailer area is located in a predictable space, this can be ascertained in a resource-sparing manner.

All three mentioned variants use different basic assumptions for an edge detection, which is why they may be used individually or also in combination in order to thereby enhance the robustness of the image-based detection of rear edge 21, 22. In a trailer combination (not shown in the figures), it is also possible to detect multiple rear edges.

In an advantageous manner, the detection of structures in the camera image sequences, in particular of edges, is able to be carried out using an extended Kalman filter.

At dusk or at night, instead of detecting rear edge 21, 22, it is furthermore possible to focus on a detection of trailer lights (not shown) of trailer 20 instead of a detection of rear edge 21, 22, so that the contours of trailer 20 and rear edge 21, 22 are able to be detected in an image-based manner.

Figure 2:
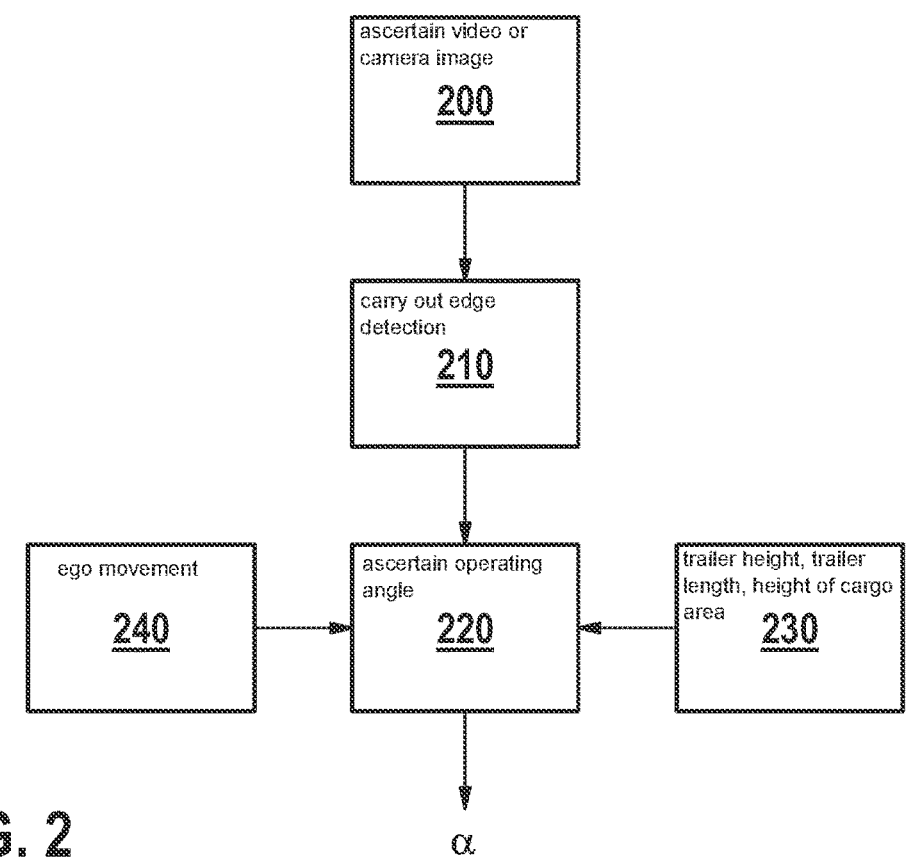
FIG. 2 shows a system diagram with an illustration of a provided method for detecting an operating angle between a tractor and a trailer of the truck.

FIG. 2 shows a basic system representation of the provided method for ascertaining an operating angle α between trailer 20 and tractor 10 of a vehicle 100.

In a step 200, a video or a camera image or a camera image sequence is ascertained using at least one rear-facing camera 11, 12 situated on tractor 10. In a step 210, the edge detection is carried out in a manner or also in a plurality of the manners described earlier in the text. In a step 220, a mathematical algorithm is carried out which ascertains the operating angle α between tractor 10 and trailer 20. Optionally, a trailer height, trailer length, height of the cargo area of trailer 20, etc. may optionally be used as additional parameters for ascertaining operating angle α in step 230. Optionally, an ego movement of vehicle 100 such as a speed, yaw rate, etc. may also be used for calculating operating angle α in a step 240.

Operating angle α as the result of step 220 is conveyed to a lateral control of vehicle 100, which is used for a lateral control of vehicle 100. In the process, operating angle α is preferably used for ascertaining an ego movement model of vehicle 100.

Figure 3:
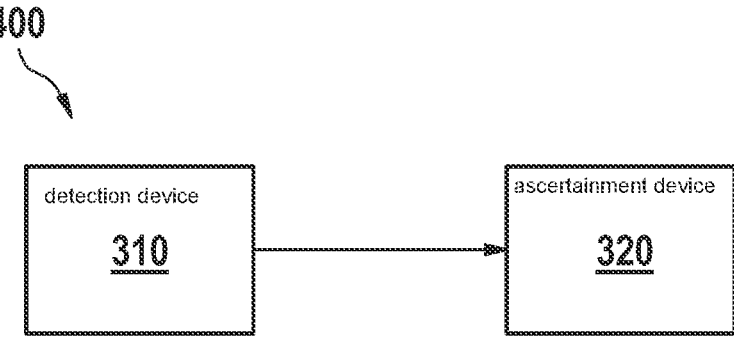
FIG. 3 shows a basic circuit diagram of a device for ascertaining an operating angle between a tractor and a trailer of a truck.

FIG. 3 shows a heavily simplified circuit diagram of a device 400 for ascertaining an angle α between tractor 10 and a trailer 20 of tractor 10. Visible is a detection device 310 for detecting a rear environment of tractor 10 with the aid of at least one rear-facing camera 11, 12. An ascertainment device 320, which ascertains operating angle α in one and/or more of the aforementioned ways, is functionally connected to detection device 310.

Ascertainment device 320 is preferably developed as a computer program product, which is running on a control unit 13 of tractor 10. Optionally, however, the control unit may also be embodied in a decentralized and separate manner from vehicle 100 in a Cloud-based way, the ascertainment of operating angle α being carried out with the aid of the decentralized control unit, and the transmission of operating angle α to vehicle 100 being realized using a powerful wireless radio connection (not illustrated).

Figure 4:
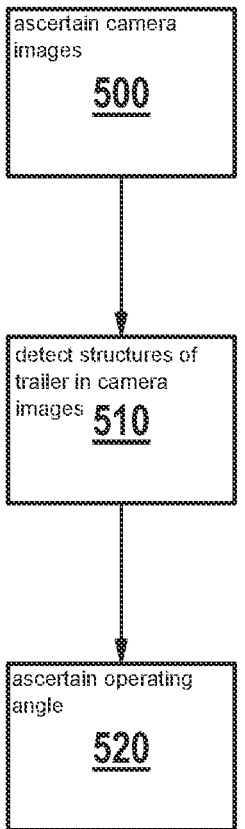
FIG. 4 shows a basic sequence of a provided method for ascertaining an operating angle between a tractor and a trailer of a truck.

FIG. 4 shows a basic sequence of a method for ascertaining an operating angle α between a tractor 10 and a trailer 20 of tractor 10.

In a step 500, an ascertainment of camera images carried out in a chronologically consecutive manner is performed using at least one rear-facing camera 11, 12 situated on tractor 10.

In a step 510, a detection of structures of trailer 20 in the camera images is carried out.

In a step 520, an ascertainment of operating angle α is taking place by evaluating the detected structures in the camera images.

One skilled in the art will also realize embodiments that are not described in above, but in view of the disclosure herein, when implementing the present invention.

What is claimed is:

1. A method for ascertaining an operating angle between a tractor and a trailer of the tractor, the method comprising the following steps:
   a) obtaining camera images simultaneously ascertained by a plurality of rear-facing cameras situated on the tractor;
   b) estimating a disparity between image data in different ones of the simultaneously ascertained camera images;
   c) based on the estimated disparity, detecting structures of the trailer in the camera images; and
   d) ascertaining the operating angle by evaluating the detected structures in the camera images.

2. The method as recited in claim 1, wherein the detecting of the structures includes detecting a rear edge of the trailer in the simultaneously ascertained camera images.

3. The method as recited in claim 1, wherein in the detection of structures of the trailer in the camera images, a classification of the detected structures and/or a neural network is used.

4. The method as recited in claim 1, wherein a mean value calculation is carried out when ascertaining the operating angle by evaluating the detected structures in the camera images.

5. The method as recited in claim 1, wherein at least one of the following parameters of a vehicle is used for ascertaining the operating angle: a trailer length, a trailer height, a height of a cargo area of the trailer, a speed of the tractor, a yaw rate of the tractor.

6. The method as recited in claim 1, wherein at least one of the following operating angles is ascertained: an angle of roll, an angle of traction, a pitch angle, an articulation angle.

7. The method as recited in claim 1, wherein the ascertained operating angle is used for setting up an ego movement model of a vehicle including the tractor and the trailer.

8. A device for ascertaining an operating angle between a tractor and a trailer of the tractor, comprising:
   a plurality of rear-facing cameras situated on the tractor; and
   a processor, wherein the processor is configured to:
      obtain camera images simultaneously generated by the plurality of rear-facing cameras;
      estimate a disparity between image data in different ones of the simultaneously ascertained camera images;

based on the estimated disparity, detect structures of the trailer in the camera images; and ascertain the operating angle by evaluating the detected structures in the camera images.

9. A non-transitory computer-readable memory medium on which is stored a computer program including program code for ascertaining an operating angle between a tractor and a trailer of the tractor, the program code, when executed by a computer, causing the computer to perform the following steps:

a) obtaining camera images simultaneously ascertained by a plurality of rear-facing cameras situated on the tractor;

b) estimating a disparity between image data in different ones of the simultaneously ascertained camera images:

c) based on the estimated disparity, detecting structures of the trailer in the camera images; and d) ascertaining the operating angle by evaluating the detected structures in the camera images.

* * * * *